(12) United States Patent
Lutjen et al.

(10) Patent No.: US 11,041,399 B2
(45) Date of Patent: Jun. 22, 2021

(54) CMC HEAT SHIELD

(71) Applicant: United Technologies Corporation, Farmington, CT (US)

(72) Inventors: Paul M. Lutjen, Kennebunkport, ME (US); Carson A. Roy Thill, South Berwick, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 53 days.

(21) Appl. No.: 16/671,288

(22) Filed: Nov. 1, 2019

(65) Prior Publication Data

US 2021/0131299 A1    May 6, 2021

(51) Int. Cl.
*F01D 5/14* (2006.01)
*F01D 11/08* (2006.01)

(52) U.S. Cl.
CPC ........... *F01D 11/08* (2013.01); *F01D 5/14* (2013.01); *F05D 2260/231* (2013.01); *F05D 2300/6033* (2013.01)

(58) Field of Classification Search
CPC .... F01D 5/14; F01D 11/08; F01D 2300/6033; F05D 2260/231
See application file for complete search history.

(56) References Cited

U.S. PATENT DOCUMENTS

| | | | | |
|---|---|---|---|---|
| 7,434,670 B2* | 10/2008 | Good | ............ | F01D 9/04 188/380 |
| 8,740,552 B2* | 6/2014 | Marusko | ............ | F01D 11/122 415/173.1 |
| 9,757,920 B2 | 9/2017 | Lazur | | |
| 2008/0206046 A1* | 8/2008 | Razzell | ............ | F01D 9/04 415/173.1 |
| 2012/0260670 A1* | 10/2012 | Foster | ............ | F01D 11/08 60/798 |
| 2012/0263582 A1* | 10/2012 | Foster | ............ | F01D 25/246 415/182.1 |
| 2014/0023490 A1* | 1/2014 | Hillier | ............ | F01D 11/005 415/173.6 |
| 2014/0271145 A1* | 9/2014 | Thomas | ............ | F01D 11/24 415/173.1 |

(Continued)

FOREIGN PATENT DOCUMENTS

| | | |
|---|---|---|
| EP | 3219932 | 9/2017 |
| WO | 2015084550 | 6/2015 |
| WO | 2015109292 | 7/2015 |

OTHER PUBLICATIONS

Extended EP Search Report for EP Application No. 20204288.3 dated Feb. 24, 2021.

*Primary Examiner* — Igor Kershteyn

(74) *Attorney, Agent, or Firm* — Carlson, Gaskey & Olds, P.C.

(57) ABSTRACT

A blade outer air seal assembly includes a blade outer air seal that has a plurality of segments that extend circumferentially about an axis and mounted in a carrier. At least two of the plurality of segments have a first wall that extends radially outward from a base portion. The base portion has a radially inner side and a radially outer side. A heat shield abuts the radially outer side of the at least two segments. The heat shield is formed from a ceramic material.

20 Claims, 5 Drawing Sheets

(56) References Cited

U.S. PATENT DOCUMENTS

| | | | |
|---|---|---|---|
| 2016/0097303 A1* | 4/2016 | Baldiga | F01D 11/12 |
| | | | 416/182 |
| 2016/0376921 A1* | 12/2016 | O'Leary | F01D 25/12 |
| | | | 415/116 |
| 2017/0260867 A1 | 9/2017 | Hafner et al. | |
| 2019/0153886 A1 | 5/2019 | Vetters et al. | |
| 2019/0292930 A1* | 9/2019 | Smiddy | F01D 25/246 |

* cited by examiner

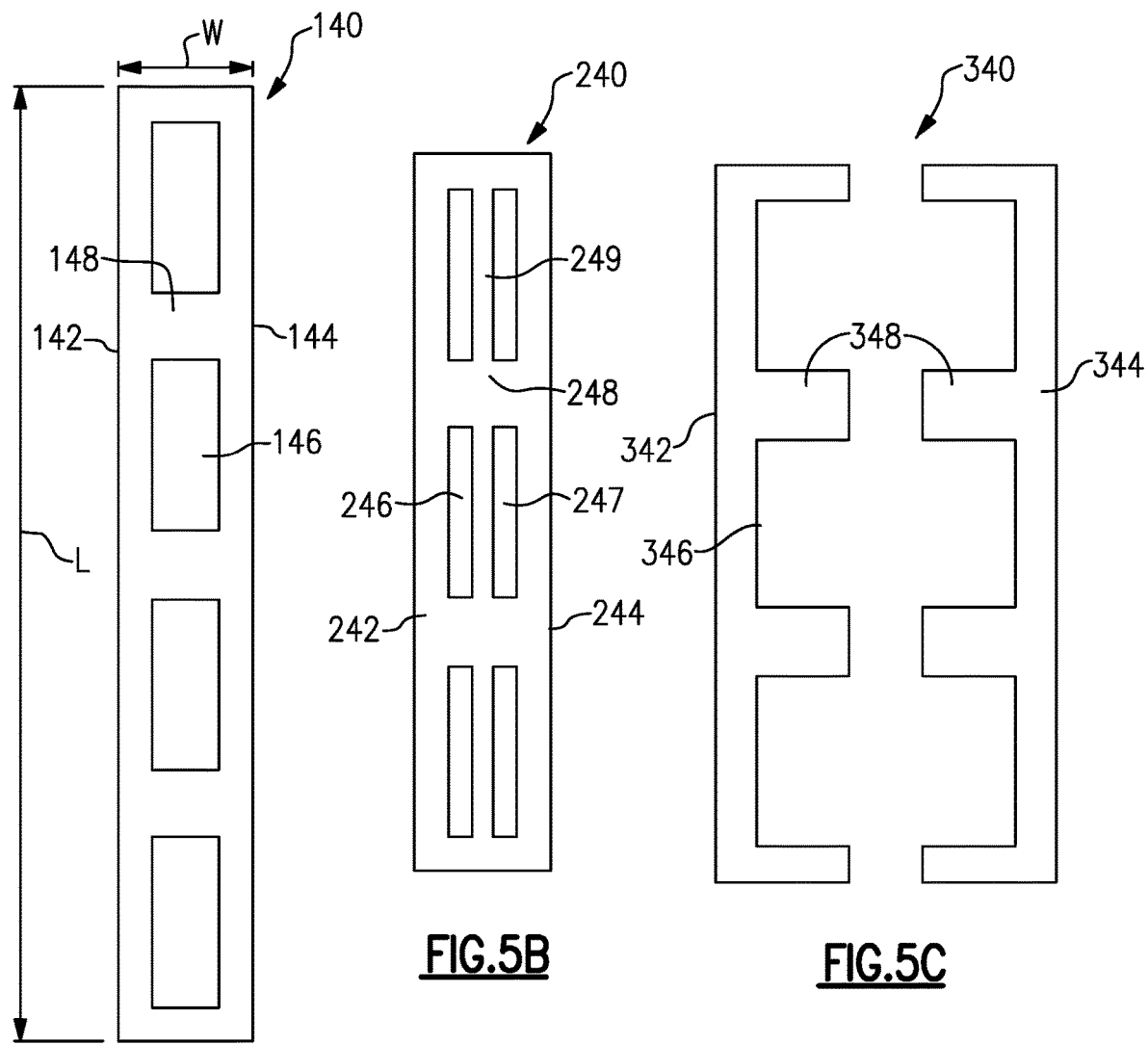

CMC HEAT SHIELD

BACKGROUND

This application relates to a heat shield, such as for use with a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Some gas turbine engine components are formed from ceramic materials.

SUMMARY OF THE INVENTION

In one exemplary embodiment, a blade outer air seal assembly includes a blade outer air seal that has a plurality of segments that extend circumferentially about an axis and mounted in a carrier. At least two of the plurality of segments have a first wall that extends radially outward from a base portion. The base portion has a radially inner side and a radially outer side. A heat shield abuts the radially outer side of the at least two segments. The heat shield is formed from a ceramic material.

In a further embodiment of any of the above, the heat shield has a plurality of windows that extend through the heat shield.

In a further embodiment of any of the above, each of the first walls extend through one of the plurality of windows.

In a further embodiment of any of the above, the heat shield has a length that extends in a circumferential direction and a width that extends in an axial direction. The length is longer than the width.

In a further embodiment of any of the above, the plurality of windows are arranged in a single row along the length.

In a further embodiment of any of the above, the plurality of windows are arranged in two rows along the length.

In a further embodiment of any of the above, the plurality of windows includes at least three windows.

In a further embodiment of any of the above, the heat shield is formed from a first axial portion and a second axial portion. The first and second axial portions together form the plurality of windows.

In a further embodiment of any of the above, each of the windows is the same shape and size.

In a further embodiment of any of the above, the at least two seal segments have a second wall that extends radially outward from the base portion. The second wall is axially spaced from the first wall. The first and second walls of each segment extend through one of the plurality of windows.

In a further embodiment of any of the above, the at least two seal segments comprise a first seal segment and a second seal segment. The heat shield spans between the first circumferential side of a first seal segment and the second circumferential side of a second seal segment.

In a further embodiment of any of the above, a radial portion extends outward from the heat shield.

In a further embodiment of any of the above, a positioning element is arranged between the carrier and the heat shield. The positioning element is configured to bias the heat shield radially inward.

In a further embodiment of any of the above, the heat shield is formed from a ceramic matrix composite material.

In a further embodiment of any of the above, the blade outer air seal is a ceramic material.

In another exemplary embodiment, a flow path component assembly includes a support structure. A flow path component has a plurality of segments arranged circumferentially about an axis and mounted in the support structure. At least two of the plurality of segments have a first wall that extends radially outward from a base portion. The base portion has a radially inner side and a radially outer side. A heat shield has at least one window that extends through the heat shield. The heat shield abuts the radially inner side of the at least two segments. One of the first walls extends through the at least one window. The heat shield is formed from a ceramic matrix composite material.

In a further embodiment of any of the above, the heat shield has a plurality of windows. Each of the first walls extend through one of the plurality of windows.

In a further embodiment of any of the above, the heat shield is configured to engage with a static structure axially forward or aft of the plurality of segments.

In a further embodiment of any of the above, a radial portion extends outward from the heat shield.

In a further embodiment of any of the above, the at least two segments are a ceramic material.

BRIEF DESCRIPTION OF THE DRAWINGS

FIG. 5A illustrates an example heat shield.

FIG. 5B illustrates another example heat shield.

FIG. 5C illustrates another example heat shield.

DETAILED DESCRIPTION

Figure 1:
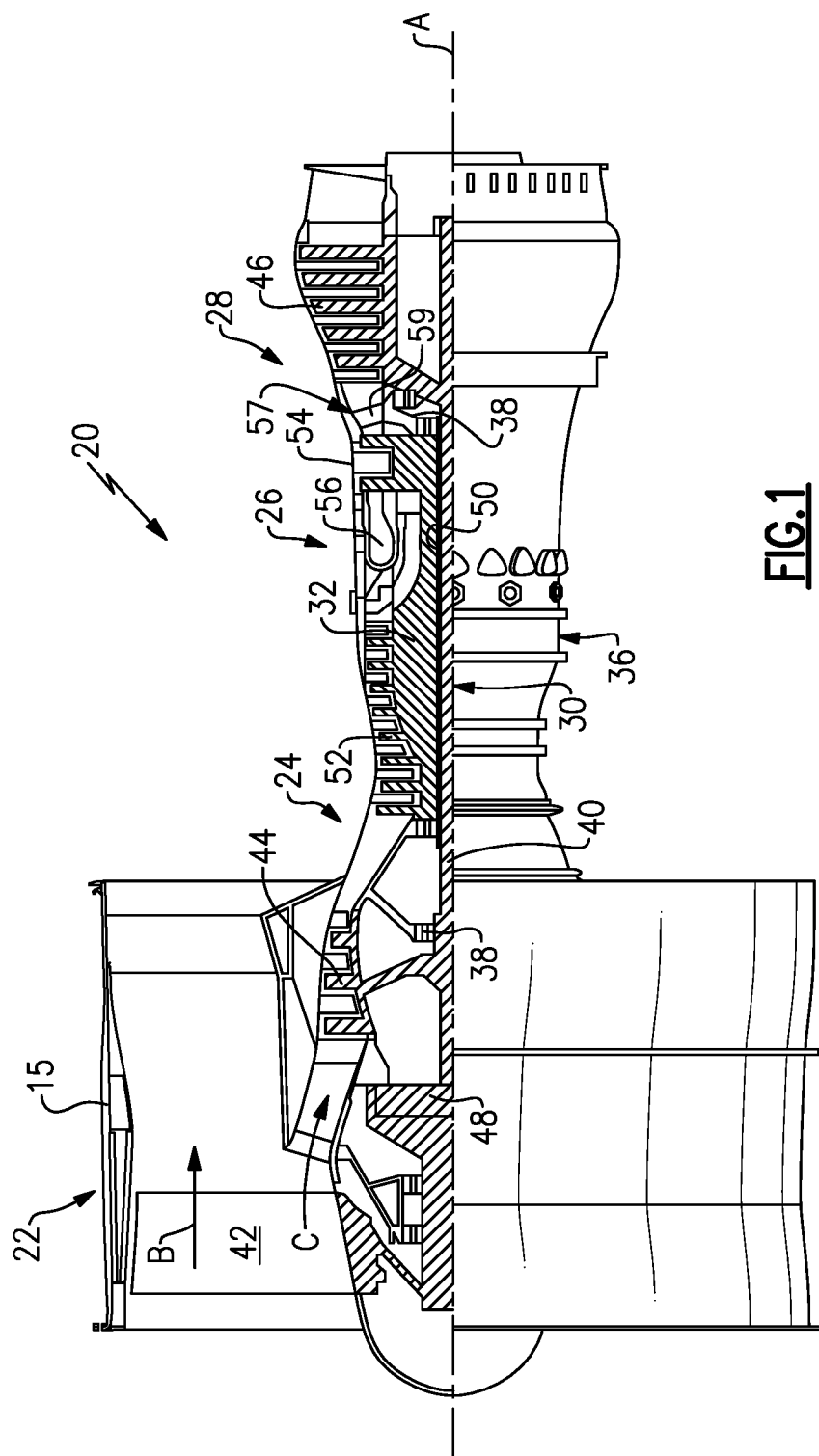
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
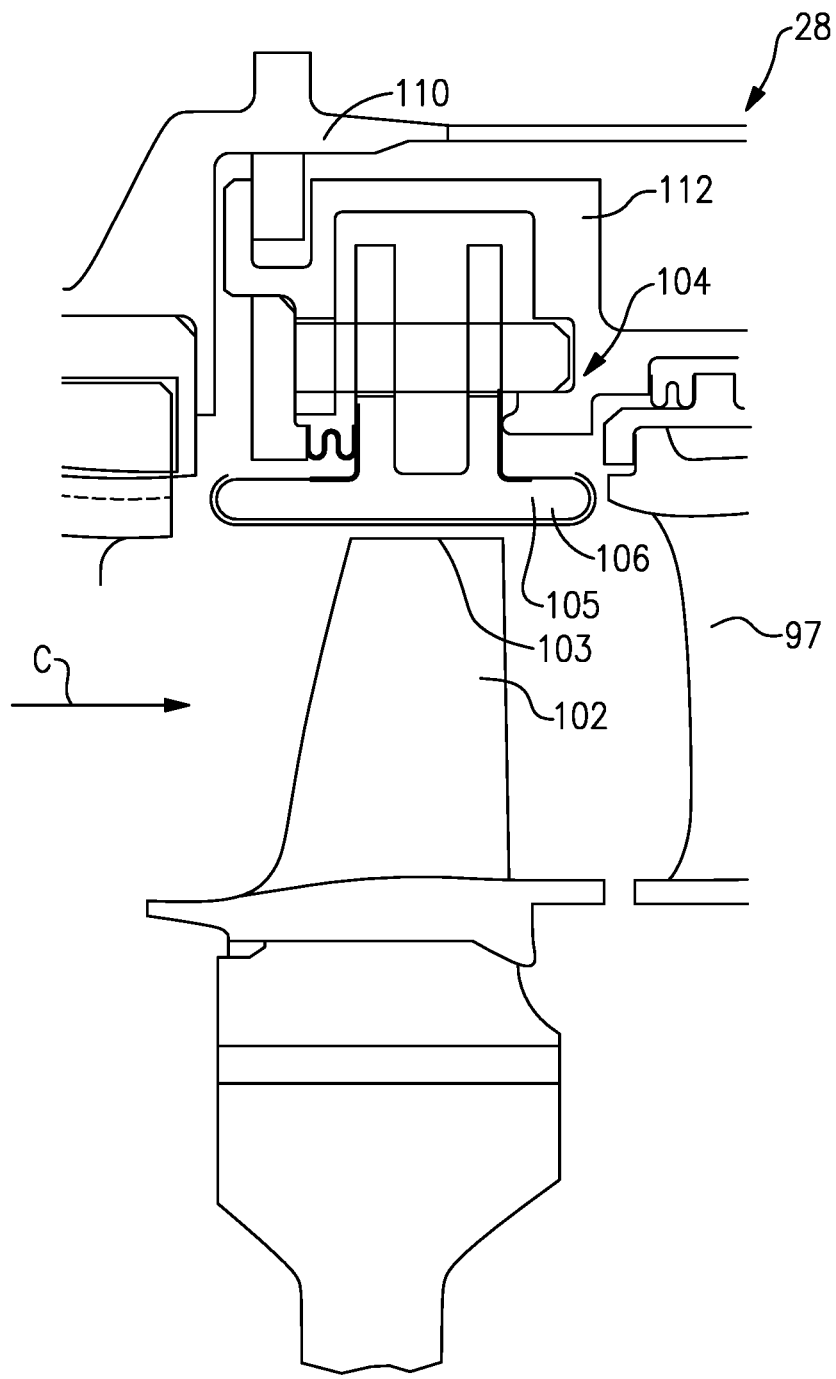
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20.

The BOAS 106 may be mounted to an engine case or structure, such as engine static structure 36 via a control ring or support structure 110 and a carrier 112. The support structure 110 may extend for a full 360° about the engine axis A. The support structure 110 may support the carrier 112 via a hook or other attachment means. The engine case or support structure holds the BOAS 106 radially outward of the turbine blades 102.

Figure 3:
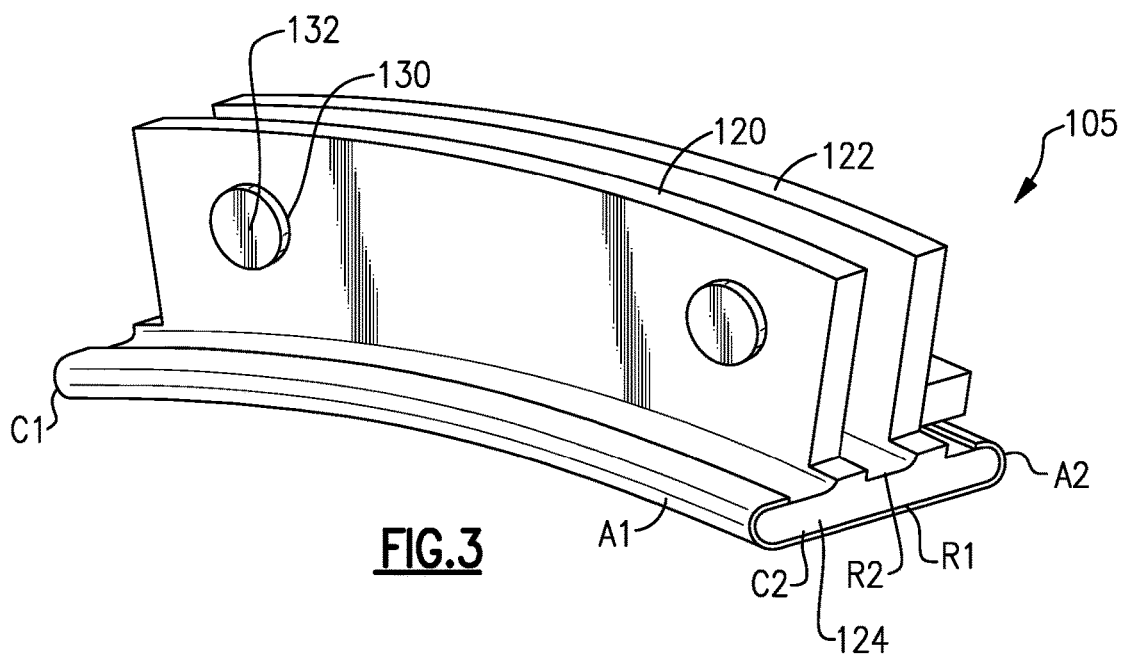
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 axially spaced from a second wall 122. The first and second walls 120, 122 extend generally radially outward from a base portion 124. The first and second walls 120, 122 may extend along an entire circumferential length of the seal segment 105, or may terminate circumferentially inward of the first and second sides C1, C2. In this example, the first and second walls 120, 122 are generally parallel to one another and perpendicular to the base portion 124. In other examples, the first and second walls 120, 122 may be angled. An aperture 130 extends through the first and second walls 120, 122, and receives a pin 132 for securing the seal segment 105 to a carrier 112. In some examples, multiple apertures 130 circumferentially spaced apart extend through the first and second walls 120, 122. Although the illustrated example shows two apertures 130, additional apertures 130 may be used in some examples.

The base portion 124 extends between the first and second axial sides A1, A2 and defines a gas path on a radially inner side and a non-gas path on a radially outer side. The base portion 124 may extend axially forward and/or aft of the first and second walls 120, 122 to provide a surface for sealing of the BOAS first and second axial sides A1, A2. In this disclosure, forward, aft, upstream, downstream, axial, radial, or circumferential is in relation to the engine axis A unless stated otherwise.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS segments 105 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further processed by adding additional material to coat the laminates. In some examples, the base portion 124 and first and second walls 120, 122 may be formed from the same number of laminate plies, and thus have substantially the same thickness. The simple arrangement of the base portion 124 and first and second walls 120, 122 allows for a simple ply layup.

Figure 4:
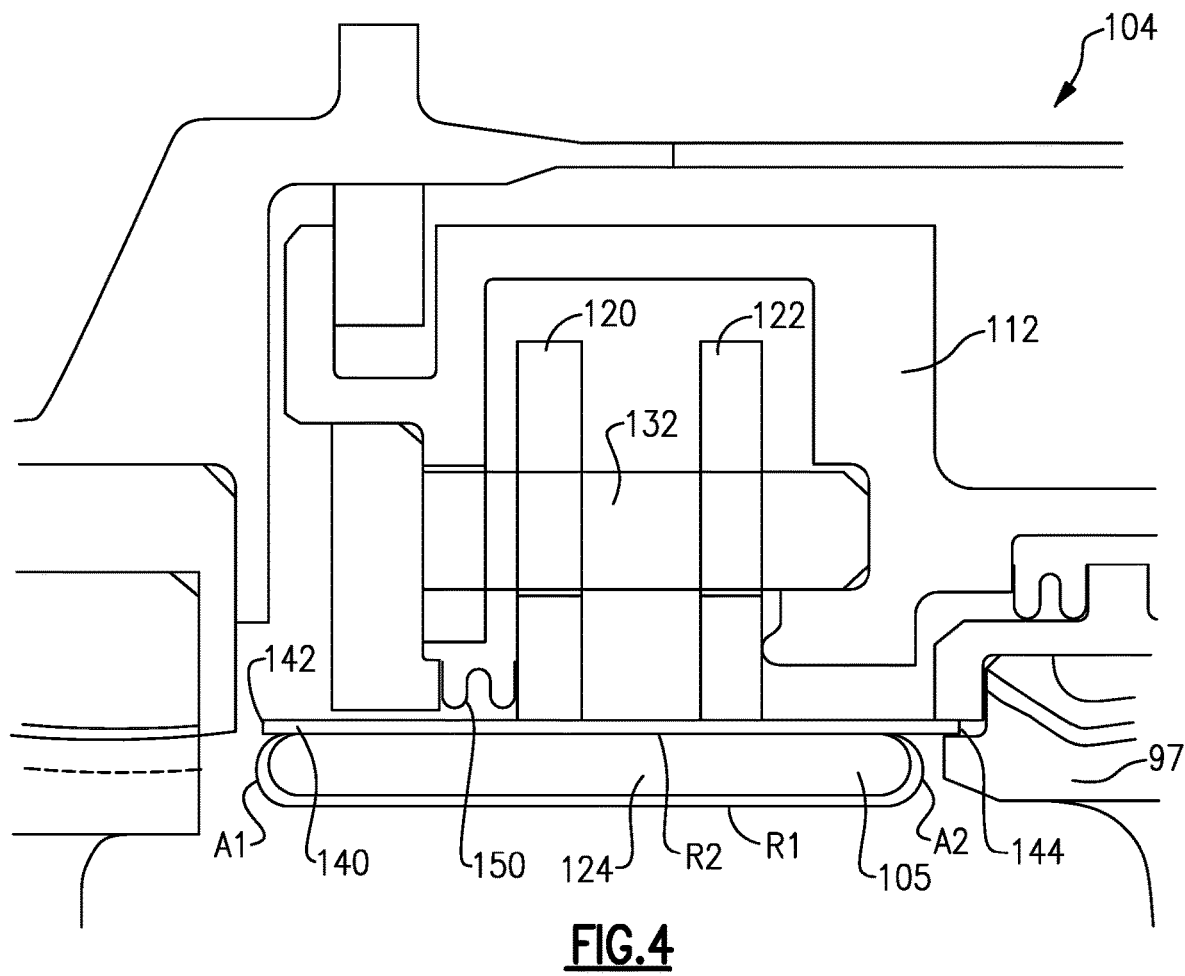
FIG. 4 illustrates a cross-section of an exemplary blade outer air seal assembly.

FIG. 4 illustrates an example blade outer air seal assembly 104. The seal segment 105 is received radially within the carrier 112, and secured in position by a pin 132 that extends through the carrier 112 and through the first and second walls 120, 122. A heat shield 140 is arranged along the radially outer side R2 of the seal segment 105. The heat shield 140 is received between the base portion 124 and the carrier 112, such that the base portion 124 is radially inward of the heat shield 140, while the first and second walls 120, 122 extend radially outward of the heat shield 140. The heat shield 140 has a first axial end 142 and a second axial end 144. The first axial end 142 extends axially forward of the first wall 120, while the second axial end 144 extends axially aft of the second wall 122. In some embodiments, the second axial end 144 engages with a vane structure 97 aft of the BOAS segment 105. In other examples, the first axial end 142 may engage with a vane structure forward of the BOAS segment 105. In some examples, a seal 150 is arranged between a portion of the carrier 112 and the BOAS segment 105. The seal 150 may be a W-seal, for example.

FIGS. 5A-5B illustrate details of example heat shields. As shown in FIG. 5A, and with continued reference to FIG. 4, an example heat shield 140 includes a plurality of windows 146. The walls 120, 122 of the BOAS segment 105 fit through one of the windows 146. The windows 146 are arranged in a single row relative to a width W of the heat shield 140. The windows 146 are spaced along a length L of the heat shield 140. The windows 146 may be evenly spaced along the length L of the heat shield 140. In the assembly 104, the length L is along the circumferential direction, and the width W is along the axial direction. Each of the windows 146 may engage a single BOAS segment 105. In some examples, multiple windows 146 may engage a single BOAS segment 105. The windows 146 may all have the same shape and size, for example. In the illustrated example, the windows 146 are rectangular. However, other shaped windows 146 may fall within the scope of this disclosure for engaging a particular BOAS design. A plurality of heat shields 140 may be arranged circumferentially about the engine axis A. In other examples, a single heat shield 140 may extend all the way about the engine axis A. The heat shield 140 may comprise a number of segments up to the number of BOAS segments 105 in the assembly 104.

The heat shield 140 may be formed from a ceramic material, such as a ceramic matrix composite. The heat shield 140 may be formed from a plurality of CMC plies layered together in a thickness direction. The windows 146 and any other features of the heat shield 140 may then be machined into the CMC plies.

FIG. 5B illustrates another example heat shield 240. In this example, two windows 246, 247 are arranged across the width W of the heat shield 240. A portion 249 separates the two windows 246, 247. When assembled, the first wall 120 of the BOAS segment 105 may be engaged in the first window 246, while the second wall 122 is engaged with the second window 247. In this example, multiple pairs of windows 246, 247 are arranged along a length of the heat shield 240. Each pair of windows 246, 247 may engage a single BOAS segment 105, for example.

FIG. 5C illustrates an example heat shield 340 having two separable halves. The first axial end 342 is formed as a separate piece from the second axial end 344. Each of the first and second axial ends 342, 344 has a portion 348 extending axially. The first and second axial ends 342, 344 are brought together in assembly, such that the portions 348 contact one another to form windows 346. In some embodiments, the portions 348 of the first and second axial ends 342, 344 may overlap one another. In other examples, one of the first and second axial ends 342, 344 may be used without the other.

Figure 6A:
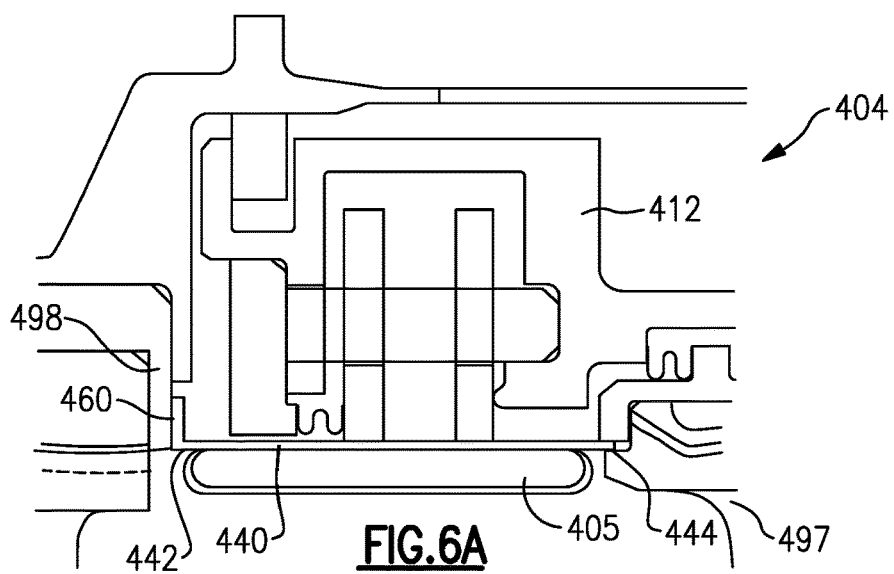
FIG. 6A illustrates another example heat shield for a blade outer air seal assembly.

FIGS. 6A-6D illustrate other example heat shields. As shown in FIG. 6A, an example BOAS assembly 404 includes a heat shield 440 arranged at a BOAS segment 405. This example heat shield 440 includes a radial portion 460 that extends radially outward from the heat shield 440. The radial portion 460 is arranged near the first axial portion 442. The radial portion 460 may engage with a forward vane support 498, for example. The radial portion 460 may extend along the length L of the heat shield 440, in some examples. The radial portion 460 helps maintain an axial position of the heat shield 440 in the assembly 405.

Figure 6B:
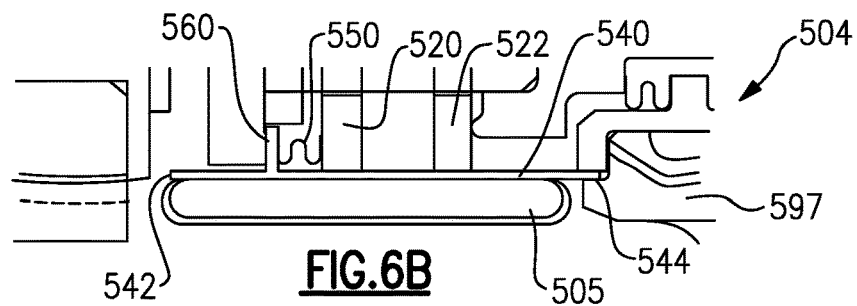
FIG. 6B illustrates another example heat shield for a blade outer air seal assembly.

FIG. 6B illustrates another example assembly 504. In this example, the radial portion 560 is arranged axially forward of the first and second walls 520, 522. A seal 550 is arranged between the radial portion 560 and the first wall 520. The seal 550 may be a W-seal, for example. In other embodiments, a W-seal may be used in other locations within the assembly 504.

Figure 6C:
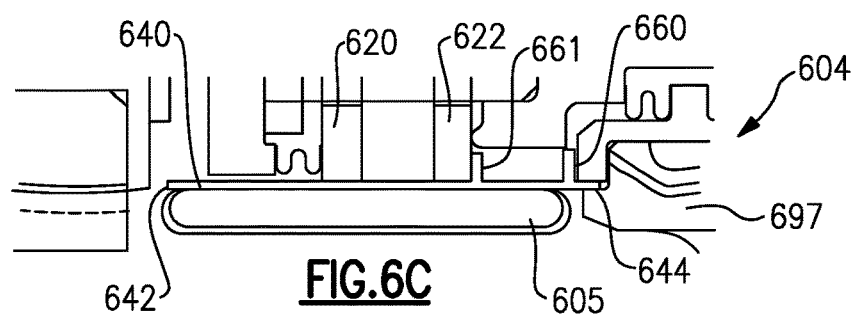
FIG. 6C illustrates another example heat shield for a blade outer air seal assembly.

FIG. 6C illustrates another example assembly 605. In this example, a first radial portion 660 and a second radial portion 661 both extend from the heat shield 640. Both the first and second radial portions 660, 661 are aft of the first and second walls 620, 622. In other examples, two radial portions may be used on either side of the first and second walls 620, 622. The first radial portion 660 may engage with a vane structure 697, for example.

Figure 6D:
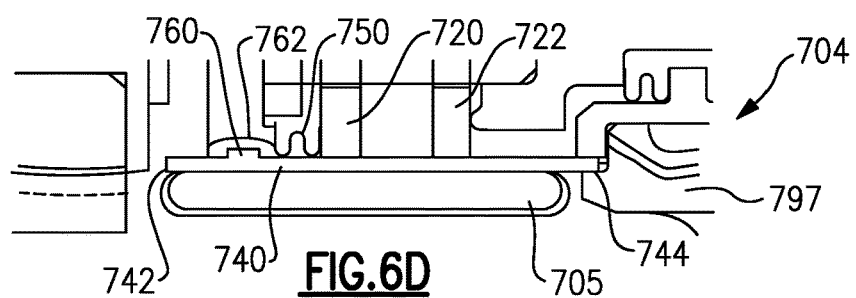
FIG. 6D illustrates another example heat shield for a blade outer air seal assembly.

FIG. 6D illustrates another example assembly 704. In this example, the radial portion 760 is arranged near the front portion 742 of the heat shield 740. A positioning element 762 engages with the radial portion 760 to help maintain the axial position of the heat shield 740.

Known BOAS assembly arrangements utilize feather seals to seal circumferential gaps between BOAS segments. Such known arrangements typically have feather seal slots machined into the BOAS segments. These arrangements may have increased localized stresses and thermal gradients. The disclosed heat shield provides another way to shield the turbine case or static structure from hot gases from the flow path. The heat shield discourages flow from the gas path from leaking into cavities in the BOAS assembly. The geometry of the disclosed heat shield bridges the intersegment gaps between adjacent BOAS segments 105. This arrangement may provide a similar effect as a feather seal, but without the need for feather seal slots and fewer components. The heat shield also forms a barrier of radiation from the BOAS to static structure radially outward of the BOAS. The heat shield is a separate piece from the BOAS segment 105 or other flow path component, and thus does not reach the same elevated temperatures as the BOAS segment 105. Thus, the heat shield may contact other seals or components without comprising the material of those components.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
    a blade outer air seal having a plurality of segments extending circumferentially about an axis and mounted in a carrier;
    at least two of the plurality of segments having a first wall extending radially outward from a base portion, the base portion having a radially inner side and a radially outer side; and
    a heat shield abutting the radially outer side of the at least two segments, the heat shield formed from a ceramic material.

2. The blade outer air seal assembly of claim 1, wherein the heat shield has a plurality of windows extending through the heat shield.

3. The blade outer air seal assembly of claim 2, wherein each of the first walls extend through one of the plurality of windows.

4. The blade outer air seal assembly of claim 2, wherein the heat shield has a length extending in a circumferential direction and a width extending in an axial direction, the length is longer than the width.

5. The blade outer air seal assembly of claim 4, wherein the plurality of windows are arranged in a single row along the length.

6. The blade outer air seal assembly of claim 4, wherein the plurality of windows are arranged in two rows along the length.

7. The blade outer air seal assembly of claim 2, wherein the plurality of windows includes at least three windows.

8. The blade outer air seal assembly of claim 1, wherein the heat shield is formed from a first axial portion and a second axial portion, the first and second axial portions together form the plurality of windows.

9. The blade outer air seal assembly of claim 1, wherein each of the windows is the same shape and size.

10. The blade outer air seal assembly of claim 1, wherein the at least two seal segments have a second wall extending radially outward from the base portion, the second wall axially spaced from the first wall, and wherein the first and second walls of each segment extend through one of the plurality of windows.

11. The blade outer air seal assembly of claim 1, wherein the at least two seal segments comprise a first seal segment and a second seal segment, and wherein the heat shield spans between the first circumferential side of a first seal segment and the second circumferential side of a second seal segment.

12. The blade outer air seal assembly of claim 1, wherein a radial portion extends outward from the heat shield.

13. The blade outer air seal assembly of claim 1, wherein a positioning element is arranged between the carrier and the heat shield, the positioning element configured to bias the heat shield radially inward.

14. The blade outer air seal assembly of claim 1, wherein the heat shield is formed from a ceramic matrix composite material.

15. The blade outer air seal assembly of claim 1, wherein the blade outer air seal is a ceramic material.

16. A flow path component assembly, comprising:
    a support structure;
    a flow path component having a plurality of segments arranged circumferentially about an axis and mounted in the support structure;
    at least two of the plurality of segments having a first wall extending radially outward from a base portion, the base portion having a radially inner side and a radially outer side; and
    a heat shield having at least one window extending through the heat shield, the heat shield abutting the radially inner side of the at least two segments, one of the first walls extending through the at least one window, wherein the heat shield is formed from a ceramic matrix composite material.

17. The flow path component assembly of claim 16, wherein the heat shield has a plurality of windows, each of the first walls extending through one of the plurality of windows.

18. The flow path component assembly of claim 16, wherein the heat shield is configured to engage with a static structure axially forward or aft of the plurality of segments.

19. The flow path component assembly of claim 16, wherein a radial portion extends outward from the heat shield.

20. The flow path component assembly of claim 16, wherein the at least two segments are a ceramic material.

* * * * *